Patented Sept. 8, 1925.

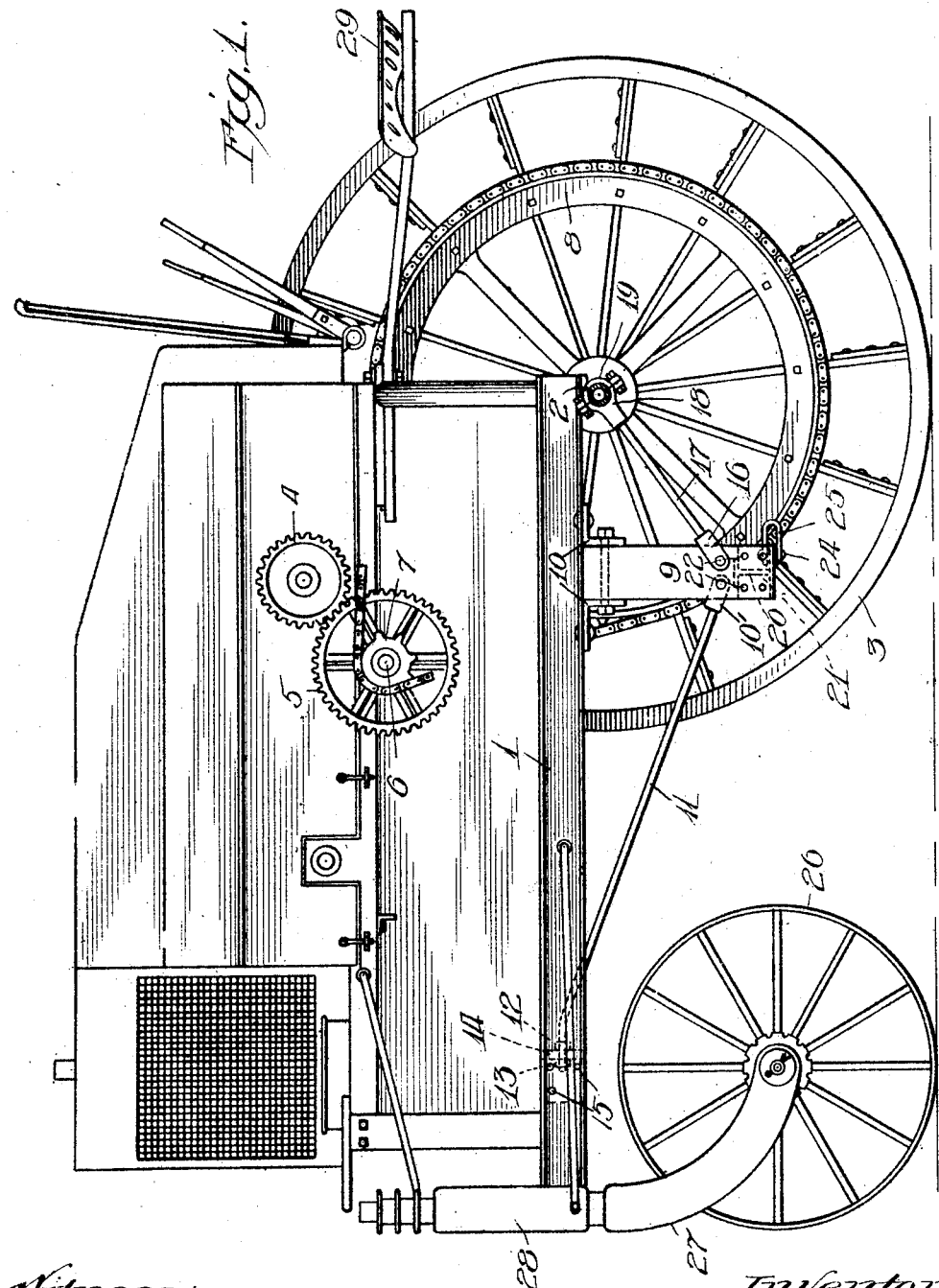

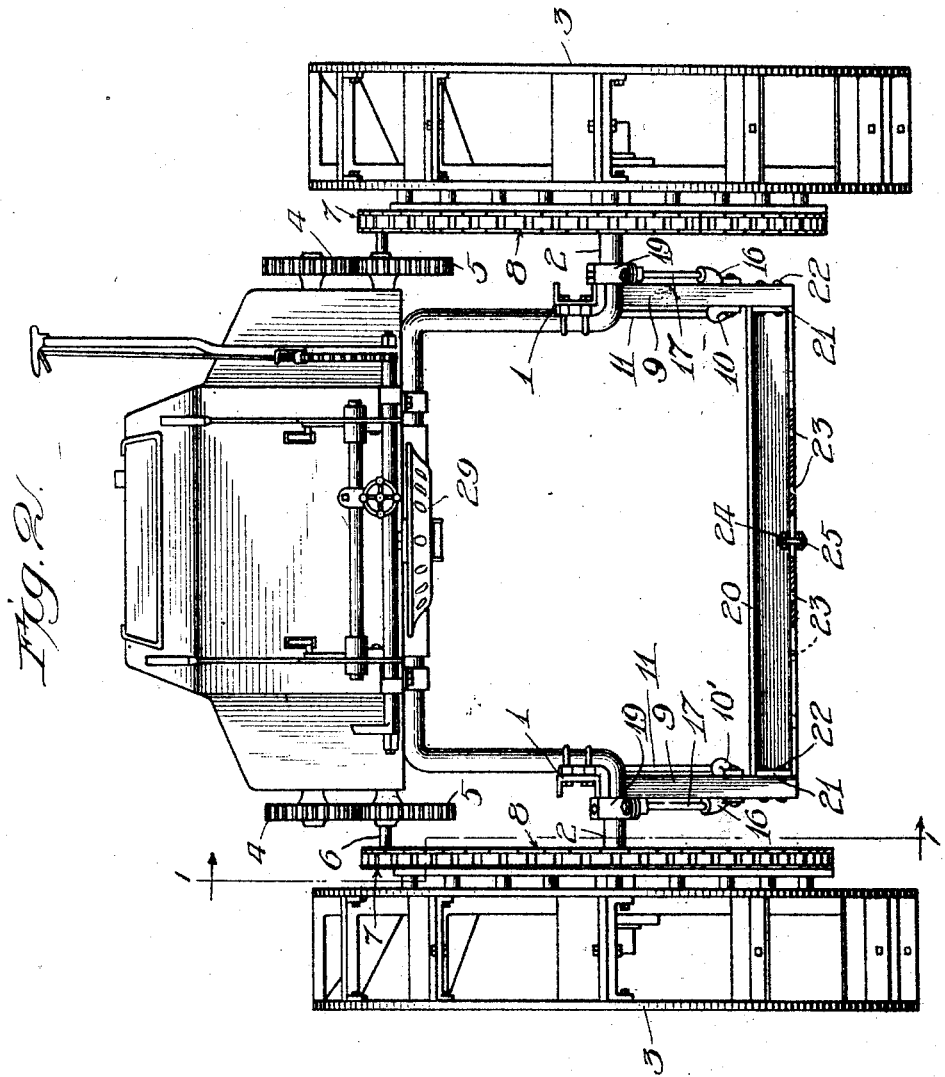

1,552,964

UNITED STATES PATENT OFFICE.

JAMES G. SINCLAIR, OF BLOOMINGTON, ILLINOIS, ASSIGNOR TO THE ILLINOIS SILO CO., OF BLOOMINGTON, ILLINOIS, A CORPORATION OF ILLINOIS.

TRACTOR.

Application filed August 16, 1917. Serial No. 186,438.

*To all whom it may concern:*

Be it known that I, JAMES G. SINCLAIR, a citizen of the United States, residing at Bloomington, in the county of McLean and State of Illinois, have invented certain new and useful Improvements in Tractors, of which the following is a specification.

My invention relates to tractors and more particularly to the manner of coupling therewith the vehicle or implement to be drawn thereby.

It is a very desirable feature in tractor construction to have the weight of the machine and the operator, and the vertical thrusts due to the operation of the machinery, as nearly counterbalanced as possible over the driving wheel axles. In operating the drive wheels to propel the tractor in a forward direction there will be set up a tendency on the part of the driving mechanism located on the forward portion of the tractor frame to lift the front end of the tractor from the ground; in other words, a tendency to cause the machine to rear backwardly around the drive wheel axles as a pivot, unless the parts and thrusts due to the machinery are counterbalanced to prevent the same. My present invention proposes to counterbalance this tendency to raise the front end of the tractor, by placing the point of coupling with the tractor of the vehicle or implement to be drawn, forward and below the axis of rotation of the drive wheels, whereby the draw bar pull will create a tendency to hold the front of the tractor to the ground, thus overcoming and counteracting the upward lift on the front end of the tractor by the driving mechanism, and resulting in producing between the drive wheels and the ground the greatest possible traction.

Among the objects of my invention therefore, is to substantially equalize the backwardly rearing tendency due to the operation of the driving mechanism, and to counterbalance the weight of the device when in action, and the operator on the seat, over the axis of the driving wheel, whereby to provide a maximum grip between the driving wheel rim and the ground; further to so locate the point of coupling with the tractor of the vehicle or implement to be drawn, that the draw bar pull will create a downward vertical thrust at the front of the tractor frame of such magnitude as to substantially counterbalance the tendency of the driving mechanism to raise this end of the tractor from the ground; further to locate the coupling point with the tractor of the vehicle or implement to be drawn, forward of the driving wheel axis and below the horizontal plane passing through said axis; and further to provide one or more caster wheels near the front of said machine upon which such a small portion of the weight of the machine will rest that they will freely caster; and such further objects and advantages as will appear as my invention becomes more thoroughly understood.

My invention further resides in that combination, construction and arrangement of parts as illustrated in the accompanying drawing, and while I have shown therein a preferred embodiment I desire the same to be understood as illustrative only and not as limiting my invention.

Referring to the drawings:

Fig. 1 is a longitudinal vertical section taken on the line 1—1 of Fig. 2, showing a tractor embodying my invention.

Fig. 2 is a rear elevation of my improved tractor.

In the drawings, 1 designates the lower member of the side frame, the rear end of which rests upon the horizontally extending portion 2 of the drive wheel axle, the drive wheels 3 being mounted for rotation thereon. Upon the upper portion of the frame work and towards the front is mounted a suitable source of motor power such as a gas engine, or the like, suitably geared by means of the gear 4 to the gear 5, which is fixedly mounted upon the shaft 6, upon the outer end of which shaft is secured the sprocket wheel 7. Suitably secured to the spokes of the driving wheel is the large sprocket wheel 8, and passing over the two sprocket wheels 7 and 8 is a suitable chain for transmitting power to the drive wheels. It is of course obvious that I may use the well known gear drive instead of the sprocket chain if desired.

Secured to the side frame 1, at each side of the machine is a downwardly extending bracket 9, which is secured to said frame by means of suitable angle plates 10, which are riveted to the frame 1, and between which angle plates is secured by means of bolts, or the like, the bracket 9. Attached to said bracket 9, and adjacent the lower end thereof is the clip 10', to which is suitably secured the tension rod 11, which is in turn secured by means of nuts 12 and 13 to the angle plate 14, which is secured near the front end of the frame 1, by means of rivets 15. Adjacent the clip 10', on the opposite edge of the bracket 9, is a similar clip 16, to which is secured the rod 17, upon the end of which is mounted the journal box 18, which carries the cap 19, and between which cap and journal box is mounted the horizontal portion 2 of the driving wheel axle. A structure similar to the one just described is also provided on the opposite side of the machine, and connecting the lower end of each of these brackets 9 is the cross bar 20, which is secured to said brackets by means of angle plates 21 and rivets 22. The cross bar 20 is in the form of an I beam, the lower rear flange of which is perforated at a plurality of points as indicated at 23, and through any desired one of which perforations extends the bolt 24 of the clevis 25, which clevis forms a coupling means by which the tongue of a vehicle or implement to be drawn may be suitably coupled with the cross bar 20. It will thus be seen that as a result of the plurality of apertures 23 this clevis 25 may be secured in any one of a plurality of adjusted positions along the bar 20, or may be secured in the central position as shown in Fig. 2, when only a single vehicle or implement is to be drawn.

At the end of the frame opposite the drive wheels are provided the caster wheels 26, the yoke 27 of which is journalled in the upright bearing 28, as a result of which these wheels may swing and caster as desired. These caster wheels may be either provided with positive steering means or they may be permitted to work idly and caster if desired. Projecting rearwardly from the machine and extending to a point back of the drive wheel axles is the operator's seat 29, the weight of the operator in this position partially counterbalancing the weight of the machine located on the front portion of the frame.

In the operation of my improved device it will be apparent that as the power is thrown on to the engine for driving the drive wheels in a forward direction the pull of the drive chain will be in a forward direction at the top of the sprocket wheel 8, and in a rear direction at the top of the sprocket wheel 7, the result being to cause the tractor to tend to be lifted off the ground at its front portion and rotate backwardly around the driving axles as a pivot; in other words, this operation of the driving mechanism will tend to cause the tractor to rear backwardly. This tendency to rear backwardly, however, will be overcome by the fact that the coupling of the implement or vehicle to be drawn is effected at a point forward and below the axis of rotation of the drive wheels, the tension of which will be transmitted through the bar 11, to the forward end of the frame 1. As a result of this it will be seen that these two forces, to wit, the one tending to cause the machine to rear backwardly, and the other tending to cause the front end of the frame to be drawn towards the ground will counteract each other, and are so designed to throw the minimum load on the front caster wheels, thus leaving them free to turn sideways and caster readily. It will also be seen that by locating the coupling means at a point forward and below the drive wheel axle that the same is brought nearer to the ground, which in combination with the counterbalancing of forces above described will result in producing a maximum grip between the drive wheel rims and the ground. This point of coupling has been found by experiment to give the most effective grip between the wheels and the ground.

The result of this distribution of forces in combination with the location of the operator's seat rearwardly of the drive wheel axles results in a machine in which practically all of the weight will rest upon the drive wheels with a minimum of weight upon the front caster wheels, thus producing the greatest possible grip between the drive wheels and the ground.

Having now described my invention, I claim:

1. In a tractor having driving and steering wheels, a supporting frame having spaced side members, depending brackets rigidly secured to each of said side members in advance of the axis of the driving wheels and having their lower ends below the horizontal plane passing through said axis, a hitch cross bar rigidly secured to the lower ends of said bracket, means on said hitch cross bar serving to selectively connect a drawn implement in lateral relation with respect to the driving wheels, the connections between said hitch cross bar and drawn implement being forward of and below the axis of the driving wheels to counteract rearing action of the tractor, and thrust means connected to said depending bracket and the axis of the driving wheels whereby stresses will be transmitted substantially radially of said axis.

2. In a tractor having a supporting frame, driving wheels rotatably connected to the rear end of the supporting frame and comprising an axle, steering wheels at the forward end of the supporting frame, depending brackets rigidly secured to the supporting frame in advance of the axle, a hitch bar rigidly secured to the lower ends of the bracket, means on said hitch bar serving to selectively connect a drawn implement in lateral relation with respect to the driving wheels, the connection between said hitch bar and drawn implement being forward of and below the axle of the driving wheels to counteract rearing action of the tractor, and thrust members connected to the lower ends of the depending brackets and to the axle whereby the draft action of the drawn implement will be partly transmitted substantially radially to said axle.

In witness whereof, I hereunto subscribe my name to this specification.

JAMES G. SINCLAIR.